Patented July 31, 1945

2,380,720

UNITED STATES PATENT OFFICE 2,380,720

PRODUCTION OF DEHYDRATED CASTOR OIL

Herman S. Bloch, Riverside, Ill., assignor to Universal Oil Products Company, Chicago, Ill., a corporation of Delaware No Drawing. Application May 26, 1943,
Serial No. 488,562

5 Claims. (Cl. 260—405.5)

This invention relates to the treatment of castor oil to produce a modified oil having the properties of a drying oil.

One object of my invention is to effect the conversion of castor oil in the presence of a solid catalyst from a non-drying oil to a material having drying characteristics.

Another object of my invention is the treatment of castor oil in the presence of a solid phosphoric acid catalyst to effect removal of water from the ricinoleic acid groups present in the oil.

A still further object of my invention comprises treating castor oil to effect its dehydration to a drying oil which may be used alone or in admixture with other natural or synthetic drying oils in the manufacture of paints, varnishes, or other coating materials, and in the preparation of synthetic resins. My process may also be adapted to produce an oil to be used in the production of lubricating oil, the reaction conditions being controlled so as to effect less dehydration than is desired for a drying oil product.

The dehydration of castor oil involves the splitting of water from the ricinoleic acid groups of the triglyceryl ester which comprises the principal constituent of said oil. In addition to the introduction of new double bonds into the glyceride of ricinoleic acid, it is also desired to effect conjugation of the double bonds simultaneously with the dehydration, as it is known that the drying speed of oils is dependent upon the proportion of conjugated systems of double bonds in the oil molecule. As used here the term "dehydration" does not refer to the mere removal of water which may be present in the castor oil undergoing treatment, but is concerned solely with the removal of hydroxyl groups together with an adjoining hydrogen in the form of water from ricinoleic acid or its triglyceride, and in so doing, introducing a second double bond into the acid molecule.

Present commercial processes for dehydrating castor oil are based chiefly on the use of liquid mineral acids such as sulfuric acid, sulfonic acids of aromatic hydrocarbons, acid esters or small quantities of acid salts of these mineral acids.

I have now found that improved results may be obtained from an easily controlled process which involves employing a solid catalyst of the type described in U. S. Patent #1,993,513 to effect dehydration of the castor oil. The catalyst comprises a phosphoric acid, and preferably the orthophosphoric acid, mixed with an adsorbent material of a predominantly siliceous character. The preferred adsorbent is kieselguhr. The liquid acid and the adsorbent are mixed and heated to the point where chemical combination between the acid and the siliceous adsorbent takes place, while the amount of free acid is reduced to a negligible proportion. Careful control of reaction conditions, including pressure, temperature, and space velocity, is also necessary to secure optimum results. By employing the solid catalyst as herein set forth, the problem of separating the product from a liquid catalyst is avoided, while the catalyst itself may be easily regenerated and reused.

Broadly, my invention comprises treating a castor oil at dehydrating temperature in the presence of a solid catalyst to effect dehydration of the ricinoleic acid groups in said oil to octadecadienoic acid groups.

In one embodiment the present invention comprises passing castor oil over a solid phosphoric acid catalyst at pressures substantially below atmospheric and under carefully regulated conditions of temperature and space velocity so as to effect substantial dehydration of said oil.

In a more specific embodiment, my invention comprises heating castor oil in the presence of a precalcined solid phosphoric acid catalyst at pressures substantially below atmospheric and under carefully controlled conditions of temperature and space velocity to effect substantial dehydration of the castor oil and to form an oil which is more completely miscible with mineral oils and which may be more readily combined with paint and varnish components.

I have found that operating at subatmospheric pressures increases the degree of dehydration, especially to olefinic rather than to etheric products. Lower pressures also reduce the oil absorption of the catalyst, so that there is little loss of desired product and regeneration of the catalyst is thereby simplified. The precalcined catalyst may be regenerated, after deactivation, by simple combustion of deposited carbonaceous material and then employed in the calcined state for further processing, with no loss of activity.

In the operation of my process, the castor oil is passed under reduced pressure through a packed reactor containing a bed of the solid catalyst at a liquid hourly space velocity of from about 1 to about 10. The oil is heated to temperatures of between 200° and 325° C. and preferably between 250° C. and 300° C. Temperatures higher than 325° C. are avoided as they tend to cause cracking and degradation of the oil as well as dehydration. The pressure is maintained at about 50 mm. of mercury or less. Preferred pressures employed are less than 30 mm. At pressures of about 50 mm. of mercury the amount of dehydration to olefinic products becomes almost equal to the amount of hydroxyl group removal, while at pressures below 30 mm. of mercury the dehydration is completely directionalized toward olefin formation. I have found that if the dehydrated oil passes from the catalyst chamber, without substantial cooling, into a receiver maintained at reduced pressure and elevated temperature, the water evolved in the dehydration process passes off as a vapor and does not condense in the receiver with the oil. The formation of troublesome emulsion is thereby avoided.

If desired, the process may be carried out in the presence of a diluent comprising paraffinic hydrocarbons such as a gas oil cut from a Pennsylvania stock. The preferred diluent is sufficiently low boiling so that it can be easily separated from the dehydrated oil by vacuum distillation, but high boiling enough so that it remains in liquid phase under the conditions of the dehydration reaction. The diluent will serve to clean the catalyst of polymers formed, thus avoiding the necessity of fairly frequent regeneration of the catalyst.

By employing the present invention, it is possible to effect over 95% dehydration of the castor oil. By regulating the time of heating and the temperature, a modified castor oil may be recovered which may be used in the manufacture of lubricating oils rather than as a drying oil.

The following examples illustrate the operation of my process but they are not to be considered unduly limiting:

Example I

The catalyst composite, which contained about 60 per cent of total $P_2O_5$, was calcined for 10 hours at 450° C. until the free $P_2O_5$ content of the fresh catalyst was 4.4%. 100 parts by weight of the catalyst were placed in a stainless steel reaction tube contained within an electrically heated furnace and equipped with an electrical preheater. The portion of the catalyst tube within the preheater section and all other space upstream of the catalyst bed was packed with quartz chips. The temperature was maintained at 275° C. and the pressure at 30 mm. The total onstream period was 8 hours. 1000 parts by weight of castor oil were passed over the catalyst at a liquid hourly space velocity of 1 and 89% by weight of the charge was recovered in the receiver as dehydrated oil. In addition to this, 1.9 per cent of dehydrated oil was recovered when the system was flushed with nitrogen gas and 1.3% was recovered from the quartz chips. After regeneration by burning in air, the catalyst was found to have a free $P_2O_5$ content of 1.7% and a total $P_2O_5$ content of 51.1%.

The crude dehydrated oil was found to have the following properties:

| | |
|---|---|
| Acid No | 36 |
| Acetyl value | 15.6 |
| Diene No. (determined on the acetylated oil) | 15.5 |
| Saponification No | 175 |
| Iodine No. (special Hanus with 400% excess of reagent) | 153 |
| Refractive index (77° F.) | 1.484 |
| Density (77° F.) | 0.932 |
| Viscosity, poises at 77° F | 1.6 |
| Gardner-Holt viscosity | F |
| Color (Gardner scale when diluted 5:1 with toluene) | 13-14 |

The product recovered was about 90% dehydrated. That is, only about 10% of the hydroxyl groups originally present remained in the castor oil.

Example II

In this case the dehydration was carried out over a 2 hour period. The catalyst employed was pretreated in the same manner as that used in Example I. 260 parts by weight of castor oil were passed over the catalyst to yield a product from which about 96-97% of the hydroxyl groups had been removed.

The crude dehydrated oil had the following properties:

| | |
|---|---|
| Acid No | 42 |
| Acetyl value | 5.7 |
| Diene No | 16.6 |
| Saponification No | 170 |
| Iodine No | 156 |
| Density (77° F.) | 0.928 |
| Refractive index (77° F.) | 1.485 |
| Viscosity, poises at 77° F | 1.1 |
| Gardner-Holt viscosity | D |
| Color (Gardner scale) | 13-14 |

The acid number and color of the crude dehydrated oil could be readily improved by the use of conventional refining agents such as lime or limestone to reduce the acidity and by the use of finely divided solid absorbents to improve the color.

I claim as my invention:

1. A process for dehydrating castor oil which comprises passing a castor oil at a dehydrating temperature over a catalyst comprising a calcined composite of a phosphoric acid and a siliceous adsorbent, said composite having been calcined at a temperature sufficient to effect chemical combination between the acid and the siliceous adsorbent.

2. A process for dehydrating castor oil which comprises passing a castor oil over a calcined composite of a phosphoric acid and a siliceous adsorbent under a subatmospheric pressure and and at temperature between about 200° and about 325° C., said composite having been calcined at a temperature sufficient to effect chemical combination between the acid and the siliceous adsorbent.

3. A process for dehydrating castor oil which comprises passing a castor oil at a dehydrating temperature over a calcined composite of a phosphoric acid and a siliceous adsorbent at a pressure of not more than 50 mm. of mercury, said composite having been calcined at a temperature sufficient to effect chemical combination between the acid and the siliceous adsorbent.

4. A process for dehydrating castor oil which comprises passing a castor oil at a dehydrating temperature over a calcined composite of a phosphoric acid and a siliceous adsorbent at a pressure of not more than 30 mm. of mercury, said composite having been calcined at a temperature sufficient to effect chemical combination between the acid and the siliceous adsorbent.

5. A process for dehydrating castor oil which comprises heating castor oil in the presence of a calcined composite of a phosphoric acid and a siliceous adsorbent at a temperature in the range of about 250° C. to about 300° C. and under a pressure of not more than 50 mm. of mercury, said composite having been calcined at a temperature sufficient to effect chemical combination between the acid and the siliceous adsorbent.

HERMAN S. BLOCH.